J. W. DONAHUE.
UNDERCUTTER.
APPLICATION FILED APR. 8, 1908.
980,928.
Patented Jan. 10, 1911.
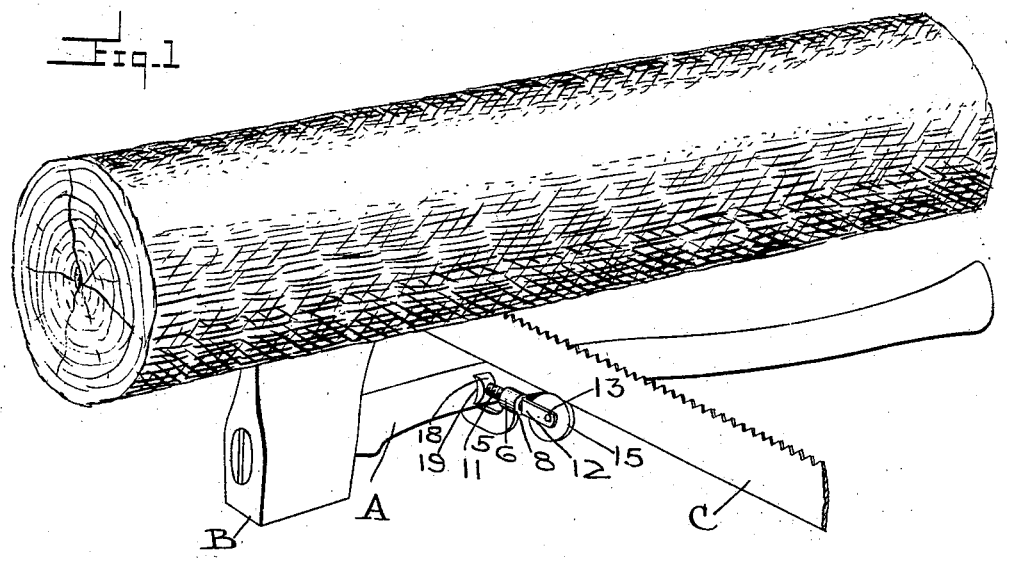
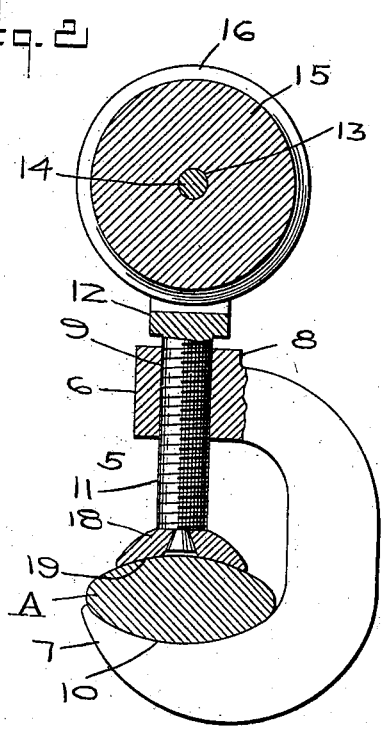
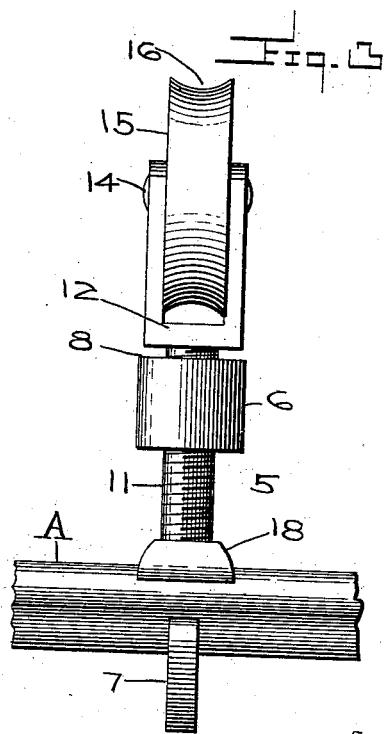
Witnesses
Ed. R. Lusby.
E. L. Chandlee
Inventor
James W. Donahue.
By Woodward & Chandlee
Attorneys

UNITED STATES PATENT OFFICE.

JAMES W. DONAHUE, OF PE ELL, WASHINGTON.

UNDERCUTTER.

980,928.   Specification of Letters Patent.   Patented Jan. 10, 1911.

Application filed April 8, 1908. Serial No. 425,893.

*To all whom it may concern:*

Be it known that I, JAMES W. DONAHUE, a citizen of the United States, residing at Pe Ell, in the county of Lewis and State of Washington, have invented certain new and useful Improvements in Undercutters, of which the following is a specification.

This invention relates to under cutters and has for an object to provide a device of this character adapted for attachment to the handle of an ax or similar cutting tool whereby the device may be disposed beneath a log to be sawed after the insertion of the cutting edge of the ax into the log for effectively supporting and guiding the saw in its movement.

A further object of this invention is to provide a device of this character which will be simple in structure, inexpensive to manufacture and which may be conveniently carried when not in use.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts in the several views, Figure 1 is a perspective view of the present device disclosing the same in use, Fig. 2 is a vertical longitudinal sectional view through the device showing the same applied to an ax handle, Fig. 3 is an edge view.

Referring now more particularly to the drawings, there is shown an under cutter 5 comprising a substantially C shaped clamp having an upper enlarged head 6 and a lower arcuate or bight portion 7 as shown. The head 6 is provided with a boss 8, and formed in this boss there is shown a vertically disposed threaded passage 9. The opposite end of said clamp is concaved or curved upon its upper face as shown at 10. The passage 9 thus receives a correspondingly threaded screw 11 having a forked upper end as shown at 12, and disposed in passages 13 formed in the fork are trunnions 14 carried by a sheave grooved circumferentially as shown at 16. The lower end of the screw 11 terminates proximal to said bight portion 7, and is connected to an arcuate swivel head 18 which is movable toward and away from the end 7. The swivel 18 is provided with a curved bottom portion 19, as shown.

In use, an ax handle which is indicated at A receives the clamp, and the stem 11 is revolved to bring the swivel head 18 tightly against face of the ax handle, the opposite face of the ax handle resting upon the curved face 10 of the bent end 7. The ax B is then suitably driven into a log as shown in Fig. 1 of the drawings, and in this position of the ax, the roller 15 assumes a position at right angles to the ax head and is thus arranged to receive the bottom edge of a saw C and effectively serves to guide the saw in its movement.

While the device is especially adapted for use in sawing from the under side of a log it will of course be understood that the same may be used in various positions for effecting different cuts.

By referring to the drawings it will be seen that the swivel head 18 is much wider than the hooked end of the clamp, whereby the latter is rigidly clamped or secured to the ax or other handle of a tool. It is further to be noted that the device is designed to be used on the side of an ax handle, which is the most practical method of application for controlling the saw in operation and consequently the sheave is of sufficient size to support and guide the saw freely beyond the receiving portion of the clamp, the latter being normally arranged on a plane with the sheave when the device is in operation.

By referring particularly to Figs. 2 and 3 of the drawings it will be seen that the swivel head 18 is clamped securely against the ax handle A by simply turning the stem 11 by means of the sheave 15, whereby an additional binding screw is dispensed with rendering the device more practical and serviceable for the purposes for which it is intended.

A device as herein set forth and described is simple, inexpensive and may be readily adjusted at any point upon the ax handle.

Having thus described my said invention, what I claim as new and desire to secure by U. S. Letters Patent, is:—

A device of the character described, comprising a clamp having a threaded opening at one end and a receiving hook at the other, a screw stem passing through said screw threaded opening on a line with the center of the hook of the clamp, a fork forming the outer end of said screw threaded stem, a swivel head at the opposite end of said screw and wider than the hooked jaw of the clamp, and a groove sheave mounted within said forked end of the stem, whereby the swivel head is brought into binding contact with the ax handle by turning the stem which carries the sheave.

In testimony whereof I affix my signature, in presence of two witnesses.

JAMES W. DONAHUE.

Witnesses:
AUGUST MAYER,
SILAS SAGE.